(No Model.)
J. W. HYATT.
BEER FILTERING APPARATUS.
No. 426,995. Patented Apr. 29, 1890.
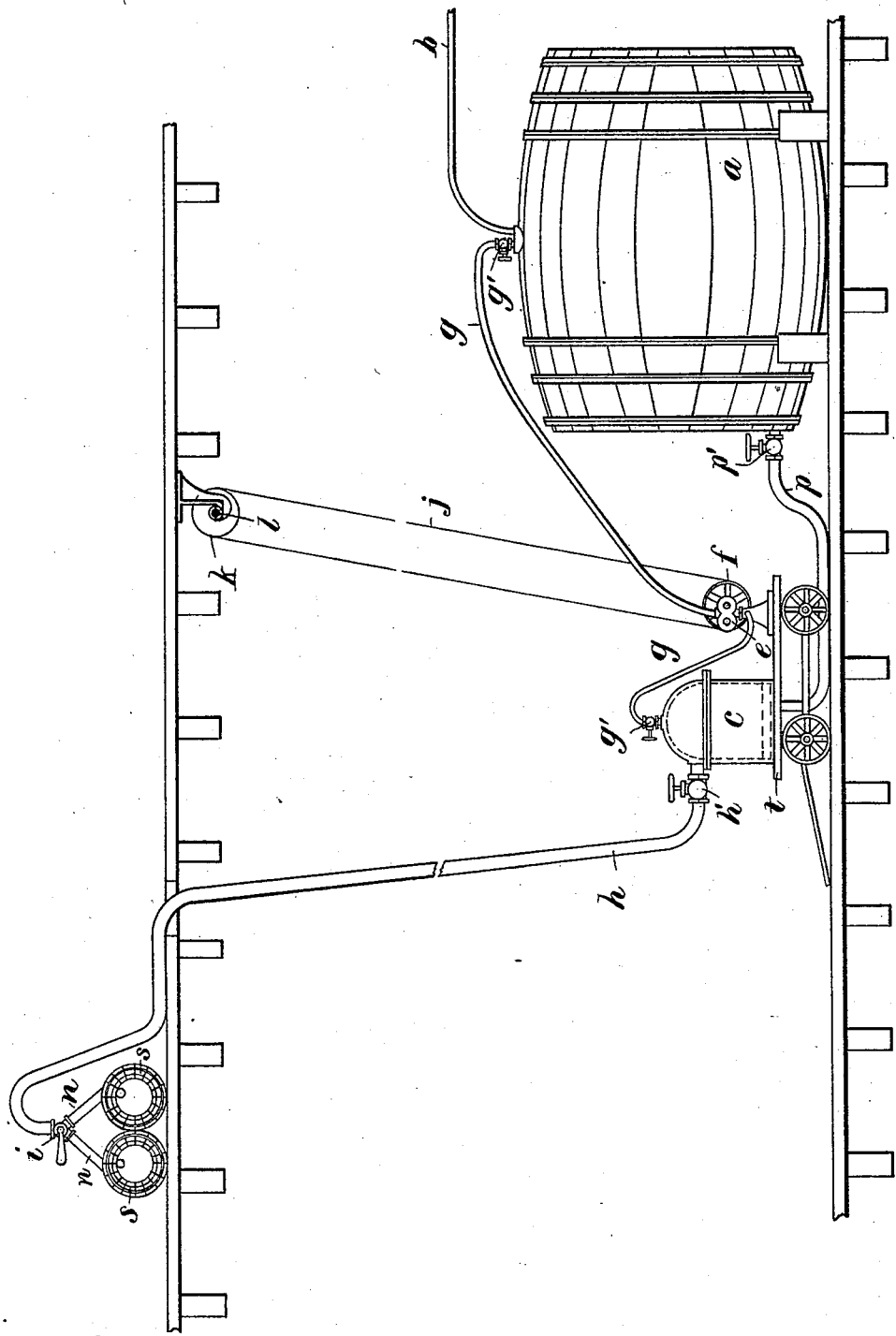
Attest:
L. Lee.
F. C. Fischer.
Inventor:
John W. Hyatt, Jr.
Crane & Miller, Attys.

UNITED STATES PATENT OFFICE.

JOHN W. HYATT, OF NEWARK, NEW JERSEY.

BEER-FILTERING APPARATUS.

SPECIFICATION forming part of Letters Patent No. 426,995, dated April 29, 1890.

Application filed August 2, 1889. Serial No. 319,505. (No model.)

*To all whom it may concern:*

Be it known that I, JOHN W. HYATT, a citizen of the United States, residing at Newark, Essex county, New Jersey, have invented certain new and useful Improvements in Beer-Filtering Apparatus, fully described and represented in the following specification, and the accompanying drawing, forming a part of the same.

The object of this invention is to clarify beer and transfer the same from the storage-cask to the kegs without loss of carbonic acid, and to avoid delivering foam into the kegs along with the beer, and this without loss or waste.

In the filtering devices heretofore for clarifying beer it has been necessary to discharge the accumulated foam at intervals from the top of the filter, or from the top of a closed receptacle. In such case the loss of beer is often considerable; and my present improvement is designed to prevent the loss of any foam or beer in such an operation, and to maintain the filter in the highest state of efficiency, both of which results I effect by drawing off a portion of the filter contents from its upper part during the filtering operation and pumping the same directly back to the storage-cask. Any gases released from the beer within the filter or within the pipes leading from the storage-cask thereto are thus immediately removed from the filter in the foam that may rise to its upper part, and the latter is enabled to perform its functions in the most effective manner, while the immediate return of the foam to the storage-cask keeps it under the desired pressure, prevents the release of more gas therefrom, and secures the filtering of the entire contents of the cask into the kegs without any loss or diminution.

My invention thus substitutes a frequent or continuous withdrawal of the foam and its immediate restoration to the cask, for the intermittent discharge of the foam from the filter and its exposure to the atmosphere.

My construction will be understood by reference to the annexed drawing, which shows a section of two floors in a building, the lower floor containing the storage-cask and the filtering apparatus, and the upper floor sustaining the kegs to receive the filtered beer.

$a$ is the storage-cask; $b$, a pipe supplying air or carbonic-acid gas thereto under pressure to force the beer through the filter $c$ to the kegs $s$.

$p$ is the pipe delivering the beer from the casks to the filter; $h$, the pipe leading the filtered beer from the filter to the kegs $s$; $i$, a cock near the end of such pipe, and $n$ branches for delivering the beer at pleasure to either of the kegs shown, which when filled will be removed in turn and replaced by others. Cocks $p'$ and $h'$ are shown in the pipes $p$ and $h$, to regulate the flow of beer, and the filter is shown sustained upon a truck $t$ for the purpose of moving it to the proximity of different storage-casks, as may be required, the pipe $p$ being disconnected at such times.

The top of the filter is connected with the cask by pipe $g$, in which is interposed a pump $e$, actuated by a pulley $f$, driven by belt $j$. The pump is shown of the rotary type, but any other form of force-pump may be used, the suction of the pump being connected with the top of the filter, and its discharge with the cask, preferably at its upper side, as shown in the drawing. Cocks $g'$ are shown in the pipe $g$ to close the outlets from the cask and filter when required.

The belt $j$ is shown driven by a pulley $k$ upon a counter-shaft $l$, attached to the ceiling above, and it is obvious that by having such counter-shaft extended over a series of storage-casks and provided with separate pulleys $k$ and belts $j$ the filter and pump may be removed by means of the truck beneath any of the pulleys $k$ and the belt applied therefrom to the pump below to actuate the same in connection with the nearest cask. The beer in the cask being kept under pressure by a supply of air or gas through the pipe $p$, the beer is allowed to flow from the cock $p'$ through the filter to the kegs $s$. The pump $e$, operating continuously, draws any foam that may accumulate within the filter through the pipe $g$ and forces it back into the cask.

A succession of kegs is applied to the pipes $n$ and filled until the contents of the storage-cask is entirely exhausted, the foam restored to the cask being wholly saved, and operating in connection with the gas forced through the pipe $b$ to press upon the surface of the beer in forcing the same from the cask.

Any form of filter or pump adapted for the purpose may be used to carry out my invention; and it is obvious that the pump may be operated by hand instead of by power, and may be operated at intervals instead of continuously, as the essential feature of the invention is not the continuous withdrawal of the foam from the filter, but the preservation of the foam under pressure when drawn therefrom, and its prompt restoration to the storage-cask to prevent its exposure to the atmosphere.

It will be noticed that the beer is introduced by the pipe $p$ into the bottom of the filter and is discharged by the pipe $h$ from the filter below its highest point, to prevent the delivery of the foam into the kegs $s$. The suction-pipe of the pump is connected with the highest point of the filter, because the gas and foam collect at such point, and may be removed without drawing off the beer itself. A filter with its inlet and outlet pipes thus arranged is preferable, but is not absolutely essential to practice my invention.

Having thus set forth my invention, what I claim herein is—

In a beer-filtering apparatus, the combination, with the filter and the storage-cask, of a pump connected with the top of the filter and the cask and operated to deliver the foam from the filter under pressure to the cask, as and for the purpose set forth.

In testimony whereof I have hereunto set my hand in the presence of two subscribing witnesses.

JOHN W. HYATT.

Witnesses:
  H. J. MILLER,
  F. C. FISCHER.